(12) United States Patent
Li et al.

(10) Patent No.: US 8,315,964 B2
(45) Date of Patent: Nov. 20, 2012

(54) COMPREHENSIVE HUMAN COMPUTATION FRAMEWORK

(75) Inventors: Shipeng Li, Palo Alto, CA (US); Yang Yang, Hefei (CN); Bin Benjamin Zhu, Edina, MN (US); Rui Guo, Beijing (CN); Linjun Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 12/258,991

(22) Filed: Oct. 27, 2008

(65) Prior Publication Data

US 2010/0106671 A1 Apr. 29, 2010

(51) Int. Cl.
*G06N 5/00* (2006.01)
(52) U.S. Cl. ............................. 706/46; 706/45
(58) Field of Classification Search .................. 706/46, 706/45
See application file for complete search history.

(56) References Cited

U.S. PATENT DOCUMENTS

| | | |
|---|---|---|
| 7,012,958 B2 | 3/2006 | Marques et al. |
| 2005/0014118 A1 | 1/2005 | von Ahn Arellano |
| 2006/0159343 A1 | 7/2006 | Grady |
| 2007/0201745 A1 | 8/2007 | Wang et al. |
| 2008/0066014 A1 | 3/2008 | Misra |
| 2008/0075367 A1 | 3/2008 | Winn et al. |
| 2008/0127302 A1 | 5/2008 | Qvarfordt et al. |

FOREIGN PATENT DOCUMENTS

WO 2008092263 A1 8/2008

OTHER PUBLICATIONS

Yampolskiy, et al., Embedded Noninteractive Continuous Bot Detection, ACM Computers in Entertainment, vol. 5, No. 4, Article 7, Mar. 2008, pp. 7:1-7:11.*
Ahn, Luis Von, "Human Computation", retrieved at <<http://reports-archive.adm.cs.cmu.edu/anon/2005/CMU-CS-05-193.pdf>>, Dec. 7, 2005, pp. 1-87.
"HTML 5—Cross-Document Messaging", retrieved at <<http://www.whatwg.org/specs/web-apps/current-work/#crossDocumentMessages>>, Oct. 6, 2008 pp. 327.
Collin Jackson and Helen J. Wang; Subspace: Secure Cross-Domain Communication for Web Mashups; Copyright WWW 2007, May 8-12, 2007, Banff, Alberta, Canada; pp. 611-619.
Chew, et al., "Image Recognition CAPTCHAs", In Proceedings of the 7th International Information Security Conference (ISC 2004), Springer, Sep. 2004, retrieved at <<http://www.cs.berkeley.edu/~tygar/papers/Image_Recognition_CAPTCHAs/imagecaptcha.pdf>>, pp. 268-279.
"The Open Mind Project", retrieved at <<http://www.openmind.org/>>, Oct. 6, 2008, pp. 2.

(Continued)

*Primary Examiner* — Wilbert L Starks
(74) *Attorney, Agent, or Firm* — L. Alan Collins; Collins & Collins Intellectual, LLC

(57) ABSTRACT

Technologies for a human computation framework suitable for answering common sense questions that are difficult for computers to answer but easy for humans to answer. The technologies support solving general common sense problems without a priori knowledge of the problems; support for determining whether an answer is from a bot or human so as to screen out spurious answers from bots; support for distilling answers collected from human users to ensure high quality solutions to the questions asked; and support for preventing malicious elements in or out of the system from attacking other system elements or contaminating the solutions produced by the system, and preventing users from being compensated without contributing answers.

20 Claims, 4 Drawing Sheets

OTHER PUBLICATIONS

Ahn, et al., "Labeling Images with a Computer Game.", retrieved at <<http://www.cs.cmu.edu/~biglou/ESP.pdf>>, CHI 2004, Apr. 24-29, 2004, Vienna, Austria, pp. 8.

Ahn, et al.,"Peekaboom: A Game for Locating Objects in Images.", retrieved at <<http://www.cs.cmu.edu/~biglou/Peekaboom.pdf, CHI 2006, Apr. 22-28, 2006, pp. 10.

Ahn, et al.,"Verbosity: A Game for Collecting Common-Sense Facts", retrieved at <<http://www.cs.cmu.edu/~biglou/Verbosity.pdf>>, CHI 2006, Apr. 22-28, 2006, pp. 4.

Ahn, et al., "Improving Accessibility of the Web with a Computer Game", retrieved at <<http://www.cs.cmu.edu/~biglou/Phetch.pdf>>, CHI 2006, Apr. 22-28, 2006, pp. 4.

Ahn, Luis Von, "Games with a Purpose", retrieved at <<http://www.cs.cmu.edu/~biglou/ieee-gwap.pdf>>, Jun. 2006, pp. 96-98.

"Google Image Labeler", retrieved at <<http://images.google.com/imagelabeler/>>, Oct. 6, 2008, p. 1.

"reCAPTCHA", retrieved at <<http://recaptcha.net/>>, Oct. 6, 2008, p. 1.

"Internet Archive", retrieved at <<http://www.archive.org/index.php>>, Oct. 6, 2008, pp. 2.

Ahn, et al.,"CAPTCHA: Using Hard AI Problems for Security", retrieved at <<http://www.captcha.net/captcha_crypt.pdf>>, pp. 18.

"Google Trends about Google Image Labeler", retrieved at <<http://www.google.com/trends?q=google+image+labeler&ctab=0&geo=all&date=2008&sort=0>>, Oct. 6, 2008, p. 1.

"Human-Based Computation", retrieved at <<http://en.wikipedia.org/wiki/Human-based_computation>>, Oct. 6, 2008, pp. 4.

"Google AdSense", retrieved at <<https://www.google.com/adsense/>>, Oct. 6, 2008, p. 1.

Gentry, et al., "Secure Distributed Human Computation", retrieved at <<http://delivery.acm.org/10.1145/1070000/1064026/p155-gentry.pdf?key1=1064026&key2=1477723221&coll=Portal&dl=ACM&CFID=27637628&CFTOKEN=20255926>>, EC'05 Jun. 5-8, 2005, pp. 155-164.

Ruderman, Jesse "Same Origin Policy for JavaScript", retrieved at <<http://www.mozilla.org/projects/security/components/same-origin.html>>, Oct. 6, 2008, pp. 3.

Wang, et al., "Protection and Communication Abstractions for Web Browsers in MashupOS.", retrieved at <<http://delivery.acm.org/10.1145/1300000/1294263/p1-wang.pdf?key1=1294263&key2=9758723221&coll=GUIDE&dl=GUIDE&CFID=5263130&CFTOKEN=73477809>>, SOSP'07 Oct. 14-17, 2007, pp. 1-15.

Guo, et al., "CompoWeb: A Component-Oriented Web Architecture", WWW 2008 / Refereed Track: Security and Privacy—Web Client Security, 2008, Apr. 21-25, 2008, retrieved at <<http://www2008.org/papers/pdf/p545-guo.pdf>>, pp. 545-554.

Keukelaere, et al., "SMash: Secure Cross-Domain Mashups on Unmodified Browsers", retrieved at <<http://domino.research.ibm.com/library/cyberdig.nsf/papers/0EE2D79F8BE461CE8525731B0009404D/$File/RT0742.pdf>>, Jun. 11, 2007 pp. 17.

Miller, George A. "WordNet: A Lexical Database for English", Communications of the ACM, Nov. 1995/vol. 38, No. 11, retrieved at <<http://delivery.acm.org/10.11451220000/219748/p39-miller.pdf?key1=219748&key2=4529723221&coll=GUIDE&dl=GUIDE&CFID=5264483&CFTOKEN=98656718>>, pp. 39-41.

"WordNet::Similarity, a Perl module for computing measures of semantic relatedness based on WordNet", retrieved at <<http://www.d.umn.edu/~tpederse/similarity.html>>, Oct. 6, 2008, pp. 2.

"EDISON: The Edge Detection and Image Segmentation system", retrieved at <<http://www.caip.rutgers.edu/riul/research/code/EDISON/index.html>>, Oct. 6, 2008, p. 1.

\* cited by examiner

COMPREHENSIVE HUMAN COMPUTATION FRAMEWORK

BACKGROUND

Certain types of problems are difficult for computing systems to solve. For example, image and video labeling is important for computers to understand images and videos and for image and video search. But automatically labeling images and videos is a hard problem for computers to solve on their own. Yet such is a fairly simple task for humans based on "common sense", although such manual labeling may be tedious and costly. Thus there may be advantages to combining humans and computers to solve certain "common sense" problems that would otherwise be very difficult for computers alone and very costly for humans alone.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for a human computation framework suitable for answering common sense questions that are difficult for computers to answer but easy for humans to answer. The technologies support solving general common sense problems without a priori knowledge of the problems; support for determining whether an answer is from a bot or human so as to screen out spurious answers from bots; support for distilling answers collected from human users to ensure high quality solutions to the questions asked; and support for preventing malicious elements in or out of the system from attacking other system elements or contaminating the solutions produced by the system, and preventing users from being compensated without contributing answers.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and networking environment, the technologies described are provided as an examples and not limitations. As those skilled in the art will appreciate, the present examples are suitable for application in a variety of different types of computing and networking environments.

Figure 1:
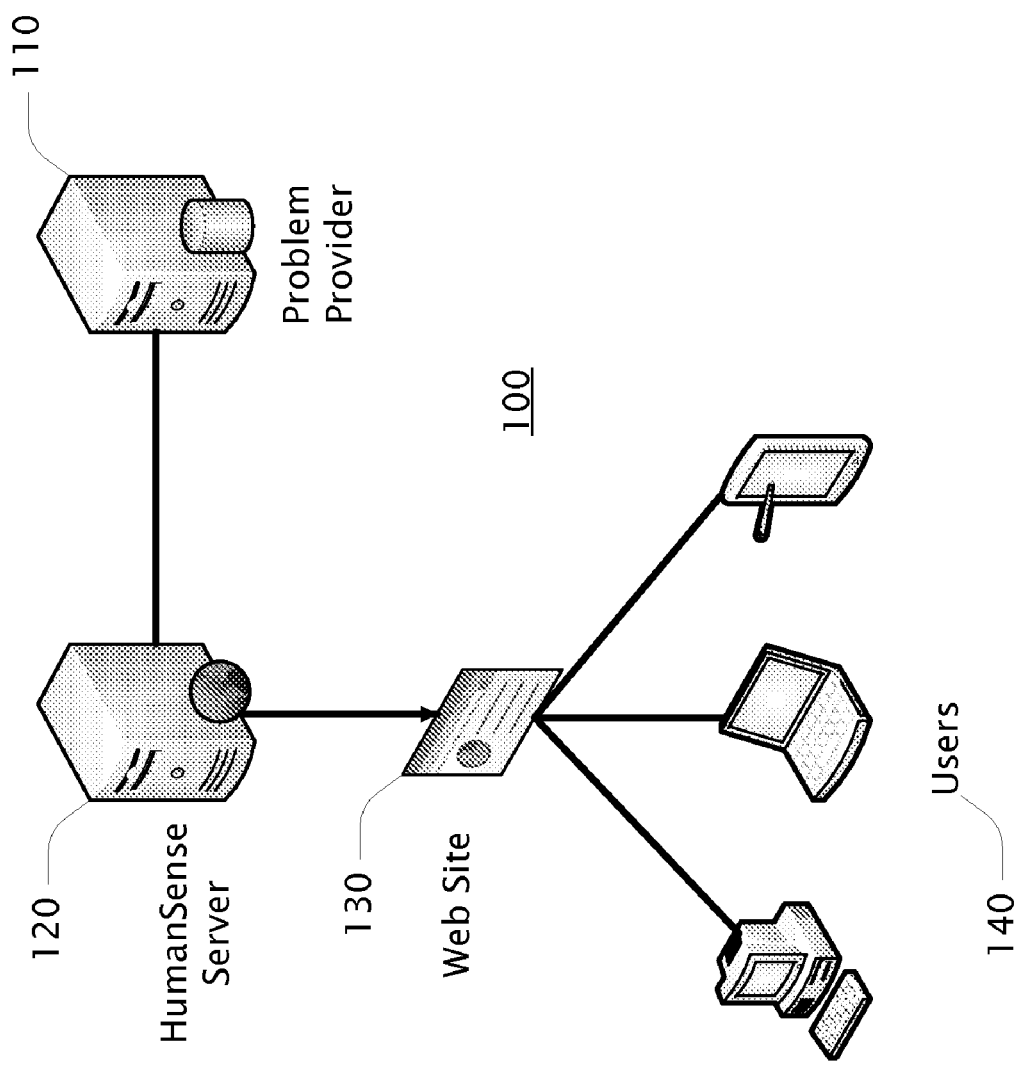
FIG. 1 is a block diagram showing an example human computation system typically referred to herein as HumanSense.

FIG. 1 is a block diagram showing an example human computation system ("HCS") 100 typically referred to herein as HumanSense. An HCS such as HCS 100 typically includes four elements types: problem provider 110, HumanSense server ("HSS") 120, participating web site 130, and users 140, all typically coupled via some network or the like. In one example, such a network may be the Internet. One or more of each of the foregoing elements may be included in an HCS.

A computational process that involves humans in performing certain steps is generally called "human-based computation", or simply "human computation". Such a system leverages differences in abilities and costs between humans and computers to achieve symbiotic human-computer interaction. HCS 100 is a framework that employs human computation to solve general common sense problems efficiently. The framework supports a range of viable business models, and can scale up to meet the demand of a large amount of common sense problems. A hosting web site or the like can be either large with heavy traffic or small with limited visitors so that every user can contribute. Such a system can be deployed at the entrance to web-based services such as web email services, software downloading services, etc. Such a system may also support a profit sharing ecosystem that motivates users to offer their solutions to problems in exchange for some form of compensation. The term "common sense problem" as used herein typically refers to a problem that is difficult for a computer to solve, but that may be fairly easy for a human to solve. One example of such a common sense problem is the identification of objects in scene, image, or video, or the like—this can be very difficult for a computer but is generally a simple common sense problem for a human to solve. Other such common sense problems may include identifying sounds; identifying human speakers or the like, or distinguishing between speakers; identifying or classifying smells or tastes; classifying music or the like; and so forth. Many other types of common sense problems may also benefit from an HCS system.

The HCS 100 framework provides several technical advantages that are novel and unique to human computation schemes, including but not limited to: support for solving general common sense problems without a priori knowledge of the problems or questions to be asked (that is, the system is problem-agnostic); support for determining whether an answer is from a bot or human so as to screen out spurious answers from bots; support for distilling answers collected from human users to ensure high quality solutions to the questions asked; and support for preventing malicious elements in or out of the system from attacking other system elements or contaminating the solutions produced by the system, and preventing users from being compensated without contributing answers.

HCS 100 typically provides a general human computation framework that binds together problem providers, web sites or the like, and users to solve large-scale common sense problems efficiently and economically, the binding provided by one or more HumanSense servers. The framework addresses technical challenges such as preventing a malicious party from attacking others, removing answers provided by bots, and distilling human answers to produce high-quality solutions to the problems. In one example described in connection with FIG. 3, the HCS 100 framework is applied to labeling images.

Problem provider 110 typically provides common sense problems that need to be solved with HumanSense. Answers from an HSS responsive to the provided problems are typically sent back to the problem provider. A problem provider and/or its administrator or the like may offers some form of compensation including money, souvenirs, free services, or anything else valuable to compensate the other elements or parties of the HCS for their contribution to solving the problems. An HCS may include one or more problems providers. In one example, a problem provider is a computer, server, web server, web service, or the like executing problem provider software. One example of such a computer is provided in connection with FIG. 4.

HumanSense server ("HSS") 120 typically selects problems provided by problem provider 110 and sends the selected problems to participating web sites, such as web site 130, fetches users' answers, analyzes them to produce solutions to the problems, and sends these answers back to problem provider 110. An HCS may include one or more HumanSense Servers. In one example, an HSS is a computer, server, web server, web service, or the like executing HSS software. One example of such a computer is provided in connection with FIG. 4.

Participating web sites, such as example web site 130, receive problems from HSS 120 and presents each of these problems to users to answer. In one example, such web sites are various Internet sites wherein a business relationship or the like has been established between administrators or the like of HSS 120 and the various Internet sites. Alternatively, web site 130 may be any suitable user interface including a non-Internet based interface and/or a non-browser based interface.

Users 140 typically contribute answers to the problems presented via web site 130 or the like. Users are typically humans that provide the answers via any suitable computing device, such as a desktop computer, laptop, mobile phone, or any other type of computing device. One example of such a computing device is provided in connection with FIG. 4. A user may provide answers in exchange for some form of compensation including money, rewards, services, or simply for fun or the like. An alternative user may be a bot or the like. The term "bot" as used herein typically refers to software applications or the like that run automated tasks over the Internet or the like. Bots are also known as Internet bots, web robots, and WWW bots. In one example, bots can be used to automate tasks at a much faster rate than humans could perform.

In a typical HCS it is generally assumed that only the HumanSense server is trusted. A problem provider may be anyone who seeks solutions to common sense problems through an HCS. A problem provider may be malicious, attacking participating web sites or tricking users into clicking a malicious link to go to a malicious web site or downloading a malicious file. A user may be untrusted too. A user may actually be a bot that provides arbitrary answers to the problems it is presented. A participating web site may also be malicious. It may collude with other participating web sites or users to greater compensation disproportionate to their contributions to problem solutions. In some cases it may be assumed that human users are benign when they are compensated for their correct answers, but they may sometimes be careless enough to provide incorrect answers.

Figure 2:
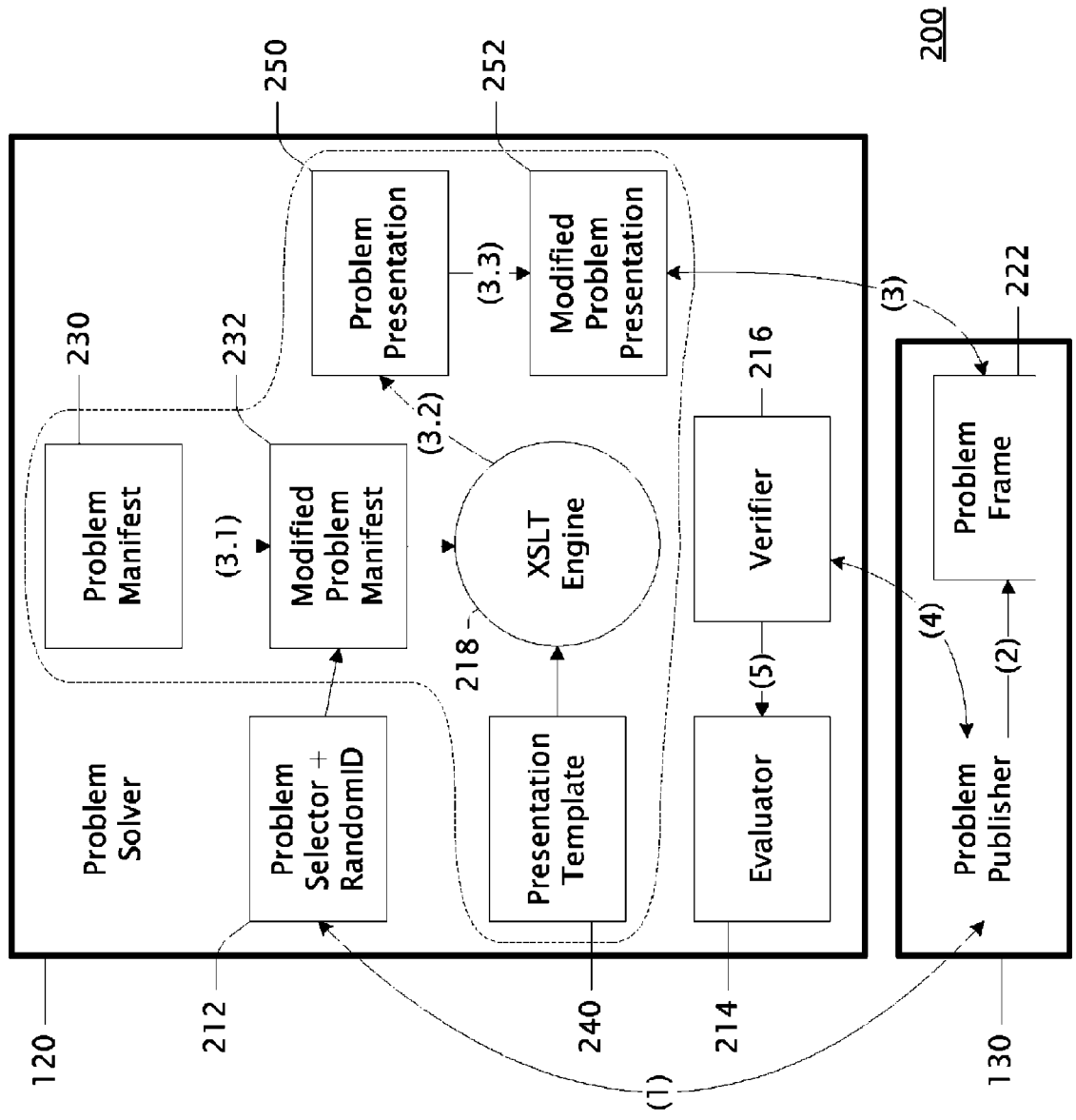
FIG. 2 is a block diagram showing example modules and interactions of an example human computation system.

FIG. 2 is a block diagram showing example modules and interactions of an example human computation system 200 such as HCS 100 of FIG. 1. Common sense problems are generally represented using a problem manifest template. Once a particular problem is encoded in such a template, it is generally known as a problem manifest that embodies the particular problem, such as example problem manifest 230. In one example, a problem manifest template ("PMT") for describing objects in an image or the like is structured using Extensible Markup Language ("XML") or the like as follows:

```
<problem>
    <id>13089</id>
    <resources>
        <image>13089.jpg</image>
    </resources>
    <priority>3</priority>
    <value>2</value>
    <type>ImageLabeling</type>
    <stage>MultipleChoices</stage>
    <labels>
        <label>tiger</label>
        <label>claw</label>
        <label>tail</label>
    </labels>
</problem>
```

Example Problem Manifest Template

Note that the above example PMT includes example values for a hypothetical problem. Other values may be used to define other problems; these values are provided only as examples and not as limitations. Problems may alternatively and/or additionally be described and/or defined using other structures or formats. Such a template generally includes the following parts that, when populated with specific values that represent a particular problem, form a problem manifest:

Problem—this is typically the root element of a problem manifest indicating that the manifest is a problem-describing manifest. In one example, a problem manifest is maintained as a file such as that stored on computer-readable media. Generally when a template includes values for a particular problem, it is considered a problem manifest for that particular problem.

ID—this field typically includes a value that is a globally unique identifier ("ID") for the particular problem, or the ID or actual ID of the particular problem.

Resources—this field typically includes various resources that may aid in the description and presentation of the problem. In one example, such resources are files that comprise graphics, video, audio, information, or the like associated with or related to the particular problem. In other examples, a resource may be a link such as a web link or the like, or some other type of information or pointer to information related to the particular problem.

Priority—this field typically includes a value indicating how often the particular problem is to be presented to users relative to problems with other priority values. In one example, the larger the priority value the higher priority the particular problem has over problems with smaller priority values.

Value—the field typically includes a value indicating how much the particular problem is worth, generally from a compensation point of view. Combined with other factors such as timeliness of answers, correctness of answers, and the like, this value is used to calculate a "score" or monetary award for an answer to the particular problem. Such a value may relate to any form of compensation or the like.

Type—this filed typically includes a value indicating a type classification for the particular problem. This value may be used by a HumanSense server 120, such as HSS 120 of FIG. 1, to determine how to process answers to the particular problem, and/or how to process and present the particular problem itself.

Considering the interactions between modules of example system 200, a user typically visits a participating web site or the like. The web site acts as a problem publisher 130 in this example. The participating web site 220 requests a common sense problem from a HumanSense server 120. HSS 120 selects a problem from a problem database or the like. In one example, such a problem database is maintained on, and the problem is provided by, a problem provider such as problem provider 110 of FIG. 1. In another example, a plurality of problems are provided to HSS 120 by distinct problem provider 110 and stored in a database associated with HSS 120.

Once a problem is selected, HSS 120 typically generates a random identifier ("ID") unique to the current session between HSS 120 and problem publisher 130 and unique to the problem selected, maps the random ID to an actual ID of the selected problem, and sends the random ID to problem publisher 130, indicated by arrow (1) of FIG. 2. Use of the random ID versus the actual ID of the selected problem helps prevent a malicious participating web site from tracking and/or logging a corresponding problem-answer pair. HSS 120 maintains the mapping between the random ID and the actual ID of the selected problem.

Once the random ID of the selected problem is received, problem publisher 130 typically prepares problem frame 222 for the selected problem, as indicated by arrow (2) of FIG. 2. In one example, the participating web site (problem publisher 130) aggregates problem frame 222 into a web page or the like. Such aggregation may be performed by creating an <iframe> or the like ("problem frame") 222 into which the selected problem may be loaded, typically using a universal resource locator ("URL") such as http://HumanSenseServer/problem?id=randomId.

A malicious problem provider may launch phishing attacks against a user by tricking the user to believe that problem frame 222 is from the web site, encouraging the user to input private data such as a password into the problem frame, resulting in the private data being secretly sent back to the malicious problem provider through embedded scripts. To prevent such phishing attacks the web site may wrap problem frame 222 in a different display style to differentiate problem frame 222 from other web page content from the web site. Further, the web site may also add a warning to problem frame 222 to warn users that problem frame 222 is used to answer common sense problems and not for private data.

Once the problem frame is created, HSS 120 typically generates a problem web page for the selected problem and sends it to problem publisher 130 for presentation in problem frame 222, as indicated by arrow (3) of FIG. 2. Generation of the problem web page involves several steps including those indicated by arrows (3.1), (3.2), and (3.3) of FIG. 2 described herein below.

As indicated by arrow (3.1), problem manifest 230 is typically modified to remove and/or modify information not needed by users resulting in modified problem manifest 232. "Not needed" information includes fields and field values of problem manifest 230 that do not contribute to a user's effort to understand and answer the problem represented by problem manifest 230. In one example, the information removed includes the unique problem ID, priority, type, and value. Further, resource references are replaced with a URL such as http://HumanSenseServer/resource?id=randomId&index=0, where the index parameter indicates the order of the resource in problem manifest 232 that the URL refers to. Since the HSS 120 maintains the association of the random ID with the actual problem ID, correct resources can be retrieved by HSS 120. Web sites or users, on the other hand, cannot tell from the resources or the random ID if the problem has already been answered or not. Therefore they cannot launch an attack to repeat an answer to the same problem.

The problem provider may be allowed to select a presentation template 240 for the selected problem, and for each problem it provides. In general, presentation template 240 is applied to modified problem manifest 232 resulting in problem presentation 250, as indicated by arrow (3.2). In one example, presentation template 240 is defined using Extensible Stylesheet Language Transformations ("XSLT") or Cascading Style Sheets ("CSS") or the like, which is applied to modified problem manifest 232 by XSLT engine or the like 218 to convert modified problem manifest 232 into problem presentation web page 250 comprised of Hypertext Markup Language ("HTML") and JavaScript to provide the user interface ("UI") for presenting the selected problem and providing for user input of answers. Further, in this example, problem presentation 250 generally includes a JavaScript function called "$collectAnswer" to designate how to collect answers from the generated UI. Since, in this example, the problem is presented in an <iframe> whose domain is different from that of the web site, the Same Origin Policy ("SOP") guarantees that the content in problem frame 222 does not introduce any cross-site scripting ("XSS") attacks to the web site.

Problem presentation 250 is typically modified resulting in modified problem presentation 252, as indicated by arrow (3.3) of FIG. 2. In one example, problem presentation 250 is a web page modified for scripts that support cross-domain communication used to, among other things, transmit tokens from problem frame 222 to host web page as further described herein below.

Modified problem presentation web page 252 is typically sent to problem publisher 130 that then presents the selected problem in problem frame 222, as indicated by arrow (3) of FIG. 2. As a user provides answers to the presented problem, it may be important to determine if the user providing the answers is human or a bot. In one example, HSS 120 adds a CAPTCHA to the problem that can be used to determining if the answering user is likely human or not. The term "CAPTCHA" as used herein refers to conventional challenge-response tests used in computing to determine that a response was not generated by a computer or bot or the like, but by a human. If a CAPTCHA was used with the problem, then verifier 216 determines that the answers were likely provided by a human. If a CAPTCHA is not added to the problem, then answers should be verified to determine if they are likely from a human user or not. Another form of CAPCHA, generally known as reCAPTCHA; poses two questions to a user-one the answer to which is known and the other the answer to which is unknown. Which is which is generally not disclosed to the user. Given answers from the user to both questions, if the known answer is correct (e.g., the user's answer matches the known answer) then the unknown answer is generally accepted as the correct answer.

When a pool of problems is small, it may be inevitable that some of the problems are repeated even though a problem is typically randomly selected. An HCS generally includes security mechanisms to protect against colluding attacks by bots and web sites unless content of a displayed problem is analyzed to extract its features that are then compared with those of previously presented problems to detect if the two problems are the same or not. Note that the problem web page sent to a participating web site does not contain any identifying information for the problem. Web sites or users generally cannot tell if two problems are the same from the web page content the problem frame receives. In addition, multiple versions of a problem can be generated, each copy being slightly different. For example, the presentation content of each version of a problem may be slightly modified without changing semantic meaning. Hence hash values of the version would be different such that it is impossible to use hash values to determine that two problems are the same. Therefore, the only way to find out if two variations of a problem are the same or not is to use content analysis, which tends to be a common sense problem itself.

When CAPTCHA or the like is not used with common sense problems, the collected answers may contain spurious answers provided by bots versus human users. These spurious answers should be removed from the collected answers to ensure the quality of the solutions produced by an HCS. Since the common sense problems cannot be reliably answered by computers (otherwise there would be no need to use human computation to find the answers), and it is highly unlikely that a fixed group of users would be able to see the same problem more than once, we can, in one example, assume that the probability that an answer provided by a bot is random with a uniform distribution, and that each answer provided by bots may be assumed to be independently and identically distributed ("IID"). Therefore the answers from bots can be modeled as an IID uniform distribution.

In one example, answers provided by bots may be detected by verifier 216 based on the IID uniform distribution modeling. For example, suppose the i-th answer to a problem P provided by a user is $a_i$. Let DA be the set of distinct answers collected for problem P, and the j-th member of DA is denoted as $A_j$. The frequency $C_{A_j}$ at which answer $A_j$ appears in the collected answers for problem P is then $C_{A_j} = \Sigma_i b_{i,j}$, where:

$b_{i,j}$={1, if $a_i=A_j$; 0, otherwise.

$C_{A_j}$ typically includes two parts: the contribution from human users $C_{A_j}^h$ and the contribution from bots $C_{A_j}^b$: $C_{A_j} = C_{A_j}^h + C_{A_j}^b$. Considering the distribution of $C_{A_j}^b$, suppose that the total number of answers and the number of distinct answers from bots are T and N, respectively. Note that T≧N. It is easy to deduce the average and standard deviation of $C_{A_j}^b$ for an IID uniform distribution:

$$<C_{A_j}^b> = T/N, \quad (1)$$

$$\sigma C_{A_j}^b = (T/N - T/N^2)^{1/2} \approx (T/N)^{1/2} \quad (2)$$

In this example, the following recursive procedure is applied to remove spurious answers from bots when an HSS has collected a statistically significant number of answers to problem P:

1. Initialize the set of answers from bots, $S_{bot}$, to be the set of all the answers collected for problem P.

2. Calculate the average and standard deviation of the answers provided by users in $S_{bot}$ by using Eqs. (1) and (2).

3. Any frequency $$C_{A_j} > k \cdot \sigma C_{A_j}^b + <C_{A_j}^b>$$

is considered human contribution and removed from $Sh_{bot}$, where k is a threshold parameter. If there is no human contribution, this process is complete. Otherwise go back to Step 2.

All answers in the resulting $S_{bot}$ of the procedure are considered answers from bots and are therefore removed from the set of all collected answers.

Generally, it may be assumed that human users are careless enough to occasionally provide erroneous answers. Evaluator 214 typically processes human answers, i.e., the collected answers if CAPTCHA is used with common sense problems or the remaining answers after the process described herein above is applied to remove spurious answers from bots, to deduce a final answer to the selected problem. This final answer is considered a solution to the selected problem.

In one example of deducing the final answer, simple majority voting is used to combine individual human answers and eliminate erroneous answers. In this example, the human answers are listed from high to low according to their frequencies of occurrence. The slope, i.e., the relative difference of the neighboring frequencies is calculated. The slope at each answer is compared with the slope of the neighboring answer, starting with the answer of the highest frequency. If there is a substantial increase in slope at an answer, that answer is the separation point. All the answers with frequencies higher than the separation point are considered as the final answer, while the remaining answers are discarded.

Figure 3:
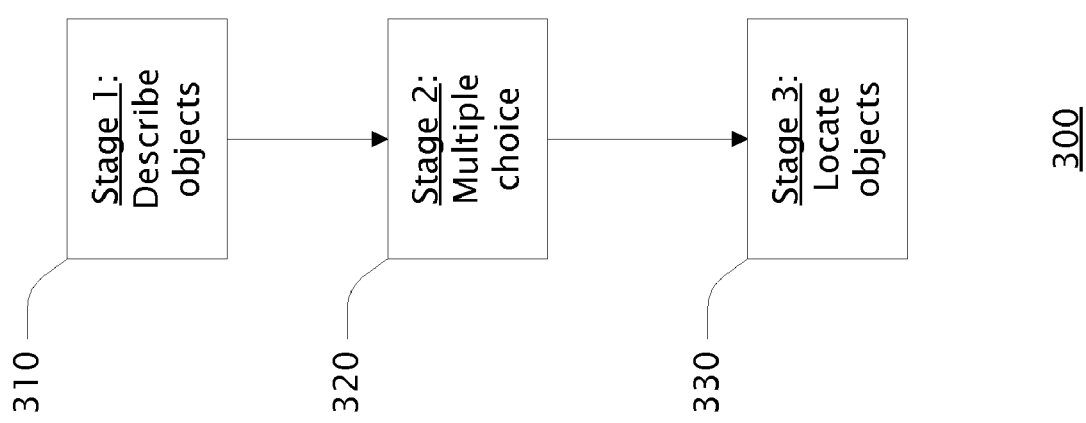
FIG. 3 is a block diagram showing an example method for labeling images performed using an example human computation system.

FIG. 3 is a block diagram showing an example method 300 for labeling images performed using an example HCS as described in connection with FIGS. 1 and 2. In this example, three incremental refinement stages 310, 320, and 330 are applied. In general, the first stage collects candidate labels of objects in an image. The second stage refines the candidate labels using multiple choices. Synonymic labels may also be correlated in this stage. To prevent bots and lazy humans from selecting all the choices, trap labels may be generated automatically and intermixed into the candidate labels. Semantic distance may be used to ensure that the selected trap labels would be different enough from the candidate labels so that human users are unlikely to incorrectly select trap labels. The last stage typically includes asking users to locate an object given a label from a segmented image. The results of these three steps are used to produce a solution to the problem of accurately labeling the image.

Block 310 typically indicates stage 1 of method 300, which includes presenting common sense questions asking users to describe objects in an image. In general, stage 1 comprises collecting raw descriptions of objects in an image and turning the collected descriptions into candidate labels for stage 2. The term "label" as used herein generally refers to a word or words descriptive of the image. Initially, all the images to be labeled are put into a pool of first stage images. Typically, there is no prior knowledge of the objects in an image. Users are requested to provide descriptions of objects that they see in the presented images. As sufficient data are collected, spurious answers from bots are removed as described herein above, and human answers evaluated as also described herein above to produce candidate labels. When candidate labels emerge, users providing more of the same candidate labels would not increase knowledge about the image. To restrict users from providing answers that are the same as these candidate labels, the candidate labels may be put into a "taboo phrase list". The "taboo phrase list" may be inserted in the problem manifest file with the information to be displayed with the image that is the subject of the common sense question. Users may then be restricted from providing labels in the "taboo phrase list". With more labels put into the "taboo phrase list", the value of the problem may be increased. When an HCS determines there sufficient labels in the "taboo phrase list", or when users commonly skip labeling an image which has labels in its "taboo phrase list", the HCS concludes that it has collected enough answers for the image. The image is then removed from the pool of the first stage images and put into the pool of the second stage images and method 300 typically continues at block 320.

Block 320 typically indicates stage 2 of method 300, which includes refining the candidate labels acquired in the first stage. In stage 2, for each image in the second stage pool, the candidate labels resulting from stage 1 are presented as a multiple choice list with the image. Users are asked to choose the multiple choice labels that are descriptive of the image. The purpose of stage 2 is typically to further improve the quality of the labels of the images. It is possible that labels collected from the first stage contain synonyms. Users may also be asked to correlate the synonyms in this stage. In some cases bots and/or lazy human users may simply choose all the labels presented resulting in no further knowledge about the image despite potentially providing compensation for answers. To deal with this problem, random trap labels may be intermixed with the candidate labels. These trap labels are typically fake labels that would not reasonably appear in the image. Selection of any trap label by a user would result in rejection of the answer.

In one example, trap labels are selected by the HCS automatically so as to not be semantically close to any candidate labels obtained from the first stage. Trap labels are typically words that may be selected from a lexical database including words and information that can be used to determine the semantic distance between the words. To obtain a trap label, a word is randomly selected from the lexical database, and then the semantic distance is calculate between the selected word and each of the candidate labels and other selected trap labels. If each of the distances is greater than a preset threshold, the selected word is considered sufficiently different—or semantically distant—from the other labels and is selected as a trap label.

Block 330 typically indicates stage 3 of method 300, which includes requesting users to locate objects in a segmented image corresponding to a given label refined at the second stage. The segmentation algorithm used may be any conventional segmentation algorithm sufficient to indicate or allow a user to indicate a specific portion of an image. In one example a segmented image is displayed such that a user can select all the segments belonging to the object represented by the given label. A user can select or deselect segments of the original image or various portion of it, so as to identify those portions described by the given label.

Figure 4:
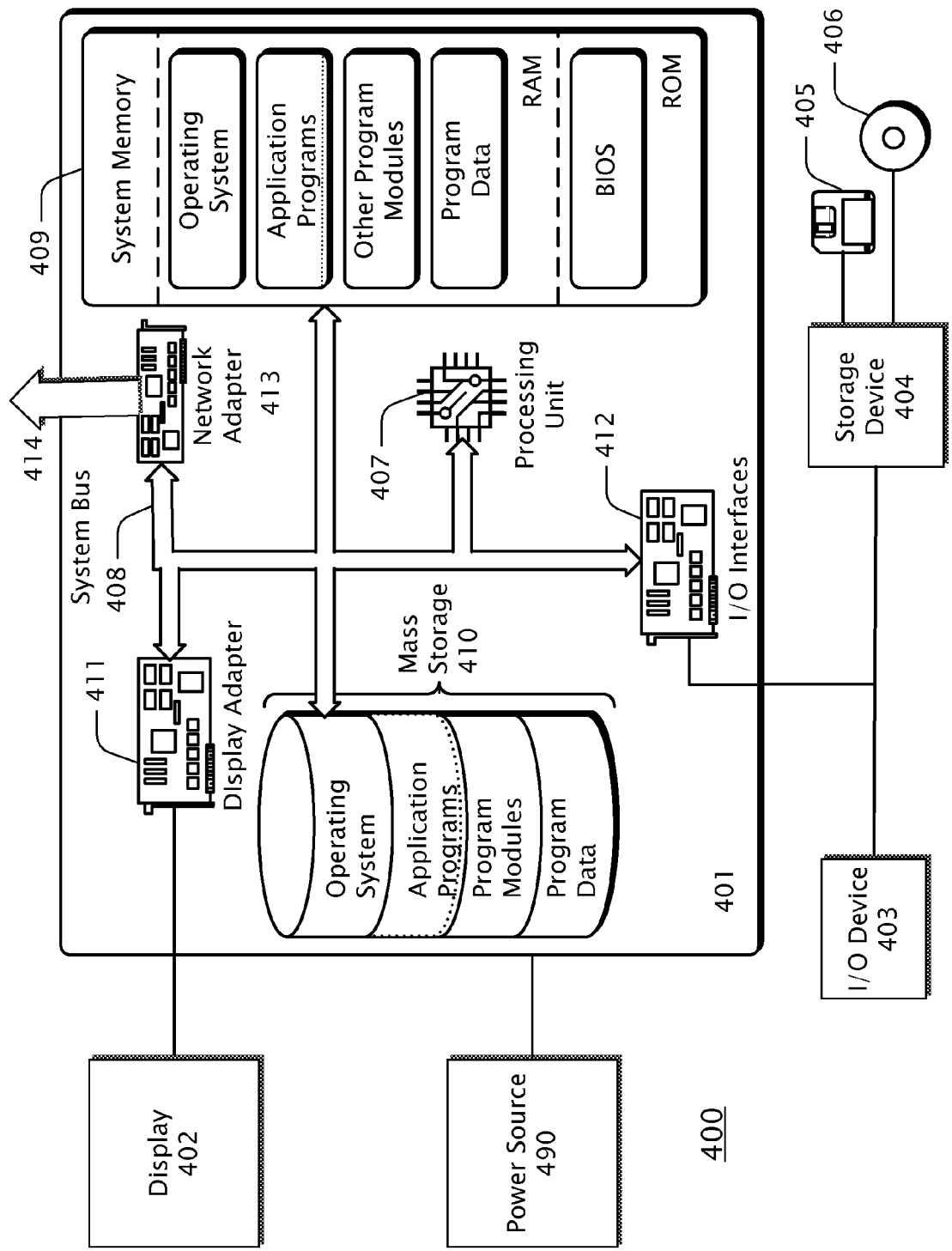
FIG. 4 is a block diagram showing an example computing environment in which the technologies described herein may be implemented.

FIG. 4 is a block diagram showing an example computing environment 400 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 400 typically includes a general-purpose computing system in the form of a computing device 401 coupled to various components, such as peripheral devices 402, 403, 404 and the like. System 400 may couple to various other components, such as input devices 403, including voice recognition, touch pads, buttons, keyboards and/or pointing devices, such as a mouse or trackball, via one or more input/output ("I/O") interfaces 412. The components of computing device 401 may include one or more processors (including central processing units ("CPU"), graphics processing units ("GPU"), microprocessors ("µP"), and the like) 407, system memory 409, and a system bus 408 that typically couples the various components. Processor 407 typically processes or executes various computer-executable instructions to control the operation of computing device 401 and to communicate with other electronic and/or computing devices, systems or environment (not shown) via various communications connections such as a network connection 414 or the like. System bus 408 represents any number of several types of bus structures, including a memory bus or memory controller, a peripheral bus, a serial bus, an accelerated graphics port, a processor or local bus using any of a variety of bus architectures, and the like.

System memory 409 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 409 typically stores data, computer-executable instructions and/or program modules comprising computer-executable instructions that are immediately accessible to and/or presently operated on by one or more of the processors 407.

Mass storage devices 404 and 410 may be coupled to computing device 401 or incorporated into computing device 401 via coupling to the system bus. Such mass storage devices 404 and 410 may include non-volatile RAM, a magnetic disk drive which reads from and/or writes to a removable, non-volatile magnetic disk (e.g., a "floppy disk") 405, and/or an optical disk drive that reads from and/or writes to a non-volatile optical disk such as a CD ROM, DVD ROM 406. Alternatively, a mass storage device, such as hard disk 410, may include non-removable storage medium. Other mass storage devices may include memory cards, memory sticks, tape storage devices, and the like.

Any number of computer programs, files, data structures, and the like may be stored in mass storage 410, other storage devices 404, 405, 406 and system memory 409 (typically limited by available space) including, by way of example and not limitation, operating systems, application programs, data files, directory structures, computer-executable instructions, and the like.

Output components or devices, such as display device 402, may be coupled to computing device 401, typically via an interface such as a display adapter 411. Output device 402 may be a liquid crystal display ("LCD"). Other example output devices may include printers, audio outputs, voice outputs, cathode ray tube ("CRT") displays, tactile devices or other sensory output mechanisms, or the like. Output devices may enable computing device 401 to interact with human operators or other machines, systems, computing environments, or the like. A user may interface with computing environment 400 via any number of different I/O devices 403 such as a touch pad, buttons, keyboard, mouse, joystick, game pad, data port, and the like. These and other I/O devices may be coupled to processor 407 via I/O interfaces 412 which may be coupled to system bus 408, and/or may be coupled by other interfaces and bus structures, such as a parallel port, game port, universal serial bus ("USB"), fire wire, infrared ("IR") port, and the like.

Computing device 401 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 401 may be coupled to a network via network adapter 413 or the like, or, alternatively, via a modem, digital subscriber line ("DSL") link, integrated services digital network ("ISDN") link, Internet link, wireless link, or the like.

Communications connection 414, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 490, such as a battery or a power supply, typically provides power for portions or all of computing environment 400. In the case of the computing environment 400 being a mobile device or portable device or the like, power source 490 may be a battery. Alternatively, in the case computing environment 400 is a desktop computer or server or the like, power source 490 may be a power supply designed to connect to an alternating current ("AC") source, such as via a wall outlet.

Some mobile devices may not include many of the components described in connection with FIG. 4. For example, an electronic badge may be comprised of a coil of wire along with a simple processing unit 407 or the like, the coil configured to act as power source 490 when in proximity to a card reader device or the like. Such a coil may also be configure to act as an antenna coupled to the processing unit 407 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 402, I/O device 403, or many of the other components described in connection with FIG. 4. Other mobile devices that may not include many of the components described in connection with FIG. 4, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A system comprising a server configured for selecting a common sense problem provided by a problem server, the server further configured for coupling to a problem publisher, the coupling configured for providing a presentation of the common sense problem to the problem publisher and to receive from the problem publisher an answer corresponding to the common sense problem, and wherein the server collects a plurality of answers to the common sense problem and removes answers from the collected plurality of answers determined to be provided by a bot and then sends remaining answers from the plurality of answers to the problem server.

2. The system of claim 1 wherein the common sense problem is represented in a problem manifest based on a problem manifest template, the problem manifest being the medium by which the common sense problem is provided by the problem server.

3. The system of claim 2 wherein the problem manifest comprises a unique identifier corresponding to the common sense problem.

4. The system of claim 3 further comprising a modified problem manifest generated by the server, wherein the server generates a random identifier that is unique to a current session between the server and the problem publisher, wherein an identifier field of the modified problem manifest includes the random identifier, and wherein the server maintains a mapping between the random identifier and the unique identifier.

5. The system of claim 4 wherein the server applies a presentation template to the modified problem manifest resulting in the presentation of the common sense problem.

6. The system of claim 5 wherein the presentation of the common sense problem is further modified by removing problem manifest field values not needed for presentation.

7. The system of claim 1 wherein the removing answers from the plurality of answers determined to be provided by a bot is based on an independently and identically distributed uniform distribution model of the answers.

8. The system of claim 1 wherein the server further removes answers from the plurality of answers determined to be erroneous, the determining based on majority voting.

9. A method comprising:
- receiving, by a server from a problem server, a problem manifest including an encoding of a common sense problem that is identified by a unique identifier stored in the problem manifest that further includes a type value that indicates a classification of the common sense problem, and a priority value that indicates a frequency of presentation of the common sense problem relative to other problems;
- selecting the common sense problem;
- generating a presentation of the common sense problem based on the problem manifest; and
- sending the presentation of the common sense problem to a problem publisher.

10. The method of claim 9 further comprising:
- collecting a plurality of answers corresponding to the common sense problem wherein one or more of the plurality of answers is responsive to a variation of the presentation of the common sense problem; and
- providing the plurality of answers to the problem server.

11. The method of claim 10 wherein the removing any answer from the plurality of answers provided by a bot is based on an independently and identically distributed uniform distribution model.

12. The method of claim 9 where the selecting the common sense problem is responsive to a request from a problem publisher.

13. The method of claim 9 wherein the random identifier is unique to a current session between the server and a problem publisher.

14. The method of claim 9 wherein the problem manifest is based on a problem manifest template that is problem agnostic.

15. The method of claim 9 wherein the presentation of the common sense problem comprises a request for a user to provide a label descriptive of an image.

16. The method of claim 9 wherein the presentation of the common sense problem comprises a request for a user to select labels from a multiple choice list of labels that are descriptive of an image.

17. The method of claim 9 wherein the presentation of the common sense problem comprises a request for a user to identify elements of an image that correspond to a label.

18. A method for labeling an image, the method comprising:
- first-presenting, by a computer, the image to a first plurality of users along with a first request for each of the first plurality of user to provide a label descriptive of the image;
- first-collecting, by the computer, the descriptive labels provided by the first plurality of users;
- second-presenting, by the computer, the image to a second plurality of users along with a second request for each of the second plurality of users to select from a multiple choice list of labels those that are descriptive of the image, wherein the multiple choice list of labels comprises the descriptive labels provided by the first plurality of users;
- second-collecting, by the computer, the selected labels provided by the second plurality of users; and
- third-presenting, by the computer, the image to a third plurality of users along with a third request for each of the third plurality of users to identify an element of the image that correspond to another label, wherein the another label is derived from selected labels provided by the second plurality of users.

19. The method of claim 18 wherein the multiple choice list includes a trap label that is semantically distant from the descriptive labels provided by the first plurality of users.

20. The method of claim 18 wherein the first-collecting does not include labels that are on a taboo phrase list.

* * * * *